(12) United States Patent
Decker et al.

(10) Patent No.: US 6,880,883 B2
(45) Date of Patent: Apr. 19, 2005

(54) SOUND-INSULATING SIDE PART FOR AN ENGINE COMPARTMENT, A MUDGUARD FOR PERFORMING THIS FUNCTION, AND A SIDE MODULE MADE FROM SUCH A MUDGUARD

(75) Inventors: Laurent Decker, Villeurbanne (FR); Philippe Gilotte, Montigny le Bretonneux (FR); Arnold Fayt, Jujurieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/353,918

(22) Filed: Jan. 30, 2003

(65) Prior Publication Data

US 2003/0168888 A1 Sep. 11, 2003

(30) Foreign Application Priority Data

Feb. 5, 2002 (FR) .............................................. 02 01351

(51) Int. Cl.⁷ .............................................. B62D 25/16
(52) U.S. Cl. ................... 296/203.02; 296/39.3; 296/198; 280/848; 280/851
(58) Field of Search ................. 296/203.02, 193.09, 296/198, 193.04, 193.11; 280/848, 851; 180/69.2

(56) References Cited

U.S. PATENT DOCUMENTS

| 5,000,483 A | * | 3/1991 | Blumel et al. ............... 280/847 |
| 5,681,072 A | * | 10/1997 | Stricker ..................... 296/39.3 |
| 6,523,886 B1 | * | 2/2003 | Hoffner et al. ........ 296/203.02 |
| 6,641,194 B1 | * | 11/2003 | Fujii et al. .................. 296/39.3 |

FOREIGN PATENT DOCUMENTS

| DE | 19 44 666 U | 4/1970 |
| EP | 0 041 353 A1 | 12/1981 |
| EP | 0 844 139 A2 | 5/1998 |
| FR | 2 764 859 A1 | 12/1988 |
| WO | WO 01/92085 A1 | 12/2001 |

* cited by examiner

Primary Examiner—Stephen Gordon
(74) Attorney, Agent, or Firm—Oliff & Berridge, PLC (57) ABSTRACT

The invention provides a sound-insulating part for a motor vehicle having an engine compartment and, beside the engine compartment, a clearance volume for accommodating vertical travel of a wheel of the vehicle, the part being characterized by the fact that it is arranged to form a sound screen between said engine compartment and said volume. The invention also provides a mudguard constituting such a sound-insulating part and a side module made from such a mudguard.

19 Claims, 6 Drawing Sheets

SOUND-INSULATING SIDE PART FOR AN ENGINE COMPARTMENT, A MUDGUARD FOR PERFORMING THIS FUNCTION, AND A SIDE MODULE MADE FROM SUCH A MUDGUARD

The present invention relates to a sound-insulating part for processing engine noise passing through the side vertical face of the engine compartment of a motor vehicle, to a mudguard performing this function, and to a side module made from such a mudguard.

BACKGROUND OF THE INVENTION

The engine compartment of a motor vehicle generates a large amount of noise due to the operation of an internal combustion engine.

To reduce the emission of sound to the outside of the vehicle, it is known to line the inside face of the hood with sound insulation and to place a screen beneath the engine to absorb sound emission and prevent engine noise from propagating to the outside of the vehicle by reflection on the roadway.

Those measures have very significant attenuating effects on the emission of engine noise to the outside of the vehicle, but they are not totally satisfactory since internal combustion engine vehicles remain quite noisy in city traffic.

The authors of the present invention have set out to find the causes of this nuisance and have established that the openings that are to be found in the vicinity of the passages for the wheels on either side of the engine compartment constitute non-negligible sources of leakage, contrary to previously-held opinion.

Thus, the inventors have established that each side region of the engine compartment lying between a fender support and the side rail situated on the same side of the vehicle needs to be made proof against noise in order to make the vehicle significantly less noisy, and in particular this needs to be done in the side region of the engine compartment which is not covered by the fender because of the presence of a clearance volume for accommodating vertical travel of a wheel.

In the invention, the term "fender support" is used to designate the part of the structure of a vehicle that performs the function of supporting the fender. This part is sometimes also referred to as "fender lining reinforcement", "scuttle reinforcement", or indeed "top side rail". Similarly, the side rail is sometimes also referred to as a "side member".

In addition to the region of the engine compartment extending between the fender support and the side rail, the inventors have identified other sources of leaks, including:

the orifice for passing the transmission shaft;
the orifice for passing the rack bar;
the orifice for passing the anti-roll bar;
the orifice for passing the suspension triangle;
the orifice for passing the shock absorber;
the clearance present between the hood and the front fender; and
the clearance between the headlight and the front fender.

OBJECTS AND SUMMARY OF THE INVENTION

In order to remedy those defects of prior vehicles, the present invention proposes "lagging" those various sources of leaks by using a specific part.

The invention thus provides a sound-insulating part for a motor vehicle having an engine compartment and, beside the engine compartment, a clearance volume for accommodating vertical travel of a wheel of the vehicle. This part is arranged to form a sound screen between said engine compartment and said volume.

Preferably, the sound-insulating part of the invention extends between a fender support and the side rail situated on the same side of the vehicle.

In a particular embodiment of the invention, the sound-insulating part includes a sound-absorbing and/or insulating lining on its face facing towards the engine compartment in order to absorb at least a fraction of the sound emitted.

In another embodiment of the invention, compatible with the preceding embodiment, the sound-insulating part supports a gasket which presses against a hood covering the engine compartment so as to close off a passage putting the engine compartment into communication with the outside of the vehicle via clearance present between the hood and a front fender of the vehicle.

In a variant, the gasket is replaced by a rib integral with the sound-insulating part and bearing directly against a sound-absorbing material and/or sound-insulating material lining the bottom face of the hood.

This ensures that the fender and the hood can remain spaced apart from each other with clearance determined by assembly criteria, but without noise leaking out.

In a particular embodiment of the invention, the sound-insulating part has a rear edge which connects continuously with a rear edge of a piece of bodywork supported by said part.

In addition, whether continuous or otherwise, said rear edge of the part of the invention can form a rear vertical bearing surface acting as a longitudinal positioning abutment for the piece of bodywork.

Thus, the piece of bodywork appropriately positioned longitudinally relative to the sound-insulating part can serve as a frame of reference for fixing the sound-insulating part on the vehicle, so that it suffices to position the piece of bodywork relative to its own environment in order to ensure that the sound-insulating part is positioned longitudinally on the vehicle.

In another embodiment of the invention, likewise compatible with the preceding embodiments, the sound-insulating part is extended beneath the side rail and shuts off the region in which the wheel shaft extends, by having a through hole of dimensions that are as tight as possible so as to allow as small as possible a passage around the wheel shaft, said through hole preferably being lined with a gasket connecting the sound-insulating part to said wheel shaft.

Such a gasket may be of the brush type, for example, or it may be constituted by a bellows. It may be overmolded on the part or it may be assembled thereon.

The sound-insulating part of the invention is situated in the immediate vicinity of another part of the vehicle which traditionally performs a function quite different from insulating engine noise, namely the mudguard. A mudguard is generally a flexible part overlying the top portion of the wheel inside the fender for preventing water and particles projected from the tire striking the inside of the fender. The mudguard is therefore intended to protect the inside of the fender, and this has the effect of preventing noise being generated by matter being thrown against the fender or to friction due to the tire running on the roadway, however that function plays no part in reducing noise emission from the engine.

Nevertheless, in a particular embodiment of the invention, the sound-insulating part can be constituted by a portion of the mudguard.

Under such circumstances, the mudguard comprises a vertical portion which serves as a screen between the fender support and the side rail of the vehicle engine compartment, and optionally extends beneath the side rail so as to shut off the region through which the wheel shaft passes. A substantially circularly arcuate portion secured to said vertical portion finishes off the mudguard so as to enable it to perform its traditional function of overlying the wheel.

When a mudguard is also used as a sound-insulating part, the invention also provides a mudguard as described above, and a mudguard arranged to be capable of carrying at least one piece of equipment such as:

a tank for headlight and windshield cleaning fluid;

a direction-indicator repeating light;

a tank gauge;

a computer;

a fuse box;

an engine connection box.

In order to be able to carry such equipment, the mudguard of the invention may include a structural portion which is preferably situated in its front region and which itself rests on the main structure of the vehicle, for example on one of its side rails.

It should be observed that this support does not require any accurate positioning since its only purpose is to support pieces of internal equipment.

The structural portion proper may be obtained by over-molding metal reinforcement or reinforcing material such as Twintex® from the supplier Vetrotex, by coinjection with a more rigid or reinforced material, or indeed by subsequently fitting a rigid part secured to the mudguard by appropriate means.

The reinforced mudguard can then be used for supporting the following pieces of equipment:

a headlight;

an intercooler radiator, possibly also with air flow ducts therefor; and a battery.

In a particular embodiment, the structural portion of the mudguard serves as the vehicle fender support.

Under such circumstances, the fender may be mounted on the mudguard away from the vehicle assembly line. The mudguard with its structural portion then constitutes a side module suitable for supporting various pieces of equipment and above all the fender, and it does so in independent manner, i.e. without requiring the presence of the structure of the vehicle.

In order to deal with leakage due to the shock absorber passing through the mudguard, a particular embodiment of the mudguard of the invention has a cap which covers the shock absorber and connects it to the mudguard. The cap forms a kind of projection from the mudguard forming a continuous covering within which the shock absorber is fully contained.

The cap is preferably made as a separate part fitted to the mudguard, and it may be made, for example, in the form of a deformable sock or a bellows.

Thus, the cap and the mudguard may be mounted separately and assembled on the vehicle with a sound tight connection in order to form the above-mentioned continuous envelope.

The present invention also provides a side module constituted by a mudguard as described above supporting a structural side part carrying a light unit and a fender mounted on the mudguard and on the structural side part.

In a particular embodiment of the invention, the mudguard may also carry a tank of fluid for washing the windshield and/or the headlight, the tank being situated between the soundproofing screen and the fender.

BRIEF DESCRIPTION OF THE DRAWINGS

In order to make the invention easier to understand, embodiments thereof are described below with reference to the accompanying drawings, in which.

MORE DETAILED DESCRIPTION

Figures 1, 2:
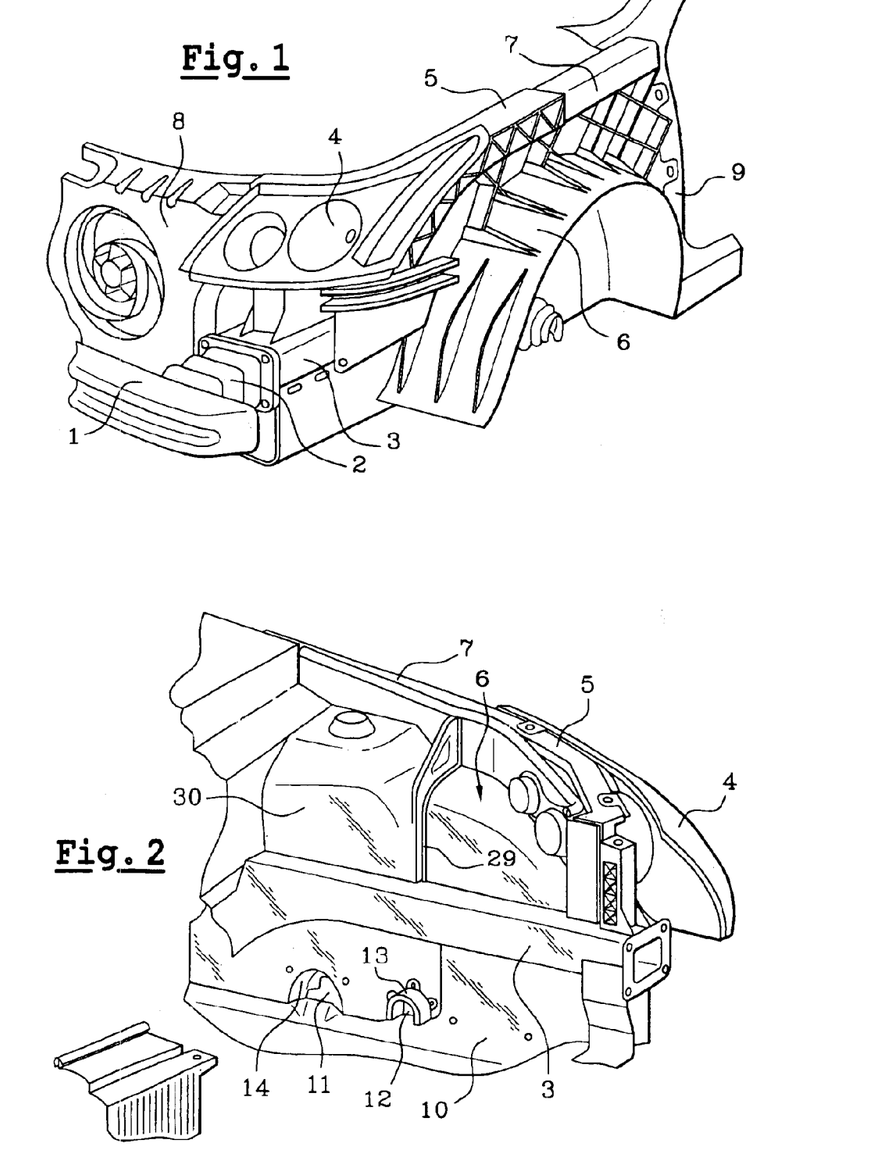
FIG. 1 is a three-quarter perspective view of the front left portion of a motor vehicle, seen from the outside.
FIG. 2 is a perspective view of the same portion of the vehicle seen from inside the vehicle.

FIG. 1 shows the front left portion of a vehicle, comprising, going from front to rear: an impact beam 1; an impact absorber 2; a side rail 3 forming part of the main structure of the vehicle; a light unit 4 supported by a structural side piece or front quarter 5; a mudguard 6; and a fender support 7.

This assembly is connected in its rear region to a door frame 9 and in its front region it is connected to a cooling cassette 8 which is a self-contained subassembly comprising a radiator and a motor-driven fan unit.

In the figures, the hood is deliberately omitted, but it covers the engine compartment and is generally lined on its inside face in a material having good sound insulation properties.

The underside of the engine compartment is shut off by a bottom screen 10 which isolates the engine unit from the roadway and prevents noise leaking out from the vehicle by reflection on the roadway.

Other soundproofing devices may be provided behind the engine, in the dash panel between the engine compartment and the cabin.

Figure 5:
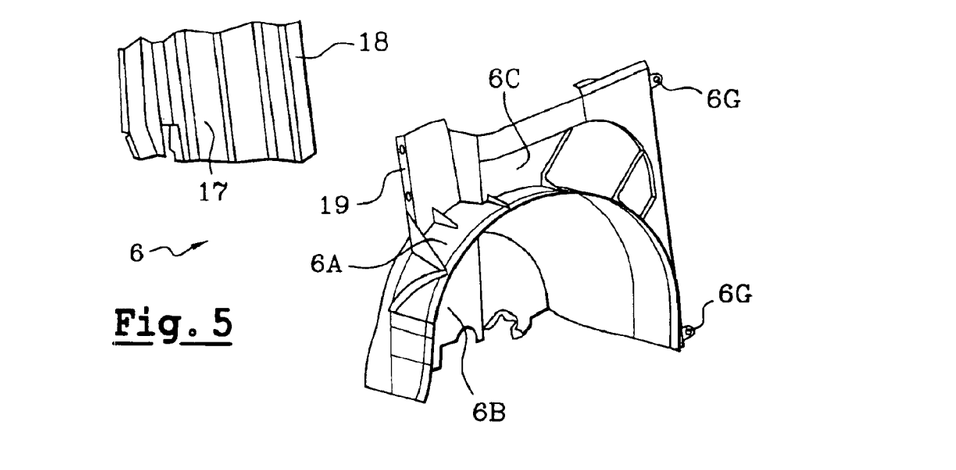
FIG. 5 is a perspective view showing two components of a sound-insulating part constituting an embodiment of the invention.

The mudguard 6 which is shown on its own in FIG. 5 is made of an ordinary flexible material such as polypropylene.

It comprises a substantially cylindrical portion 6A extending above the top half of the wheel (not shown) and two substantially vertical portions 6B and 6C, a low one of which 6B extends between the cylindrical portion 6A and the side rail 3, and a high one of which 6C extends between the cylindrical portion 6A and the fender support 7.

The two substantially vertical portions 6B and 6C of the mudguard are covered, e.g. by implementing an overmolding method, on their faces facing towards the engine compartment of the vehicle in a sheet of foam 6H (visible in FIGS. 7 and 9) or of some other sound-absorbing material, having the function of preventing soundwaves coming from the engine compartment being transmitted to the screen.

The mudguard provided with its top and bottom portions constitutes a sound screen closing off the engine compartment in the vicinity of the wheel.

As can be seen in FIG. 2, the vertical low portion 6A of the mudguard is terminated level with the wheel axis where it has two cutouts 11 and 12, one for passing a rack bar and the other for passing the axle, and it is connected to the bottom screen 10 shutting off the underside of the engine.

Each cutout 11, 12 may be lined with a sound-insulating element, such as a bellows or a half-sleeve, or indeed flexible lips that are fitted thereon, said sound-insulating element being overmolded or coinjected with the remainder of the mudguard.

In the example of FIGS. 1 and 2, the passage for the axle is provided with a half-sleeve 13 while the passage for the rack bar is lined with a bellows 14, both the half-sleeve and the bellows being separate pieces fitted thereto.

Figure 3:
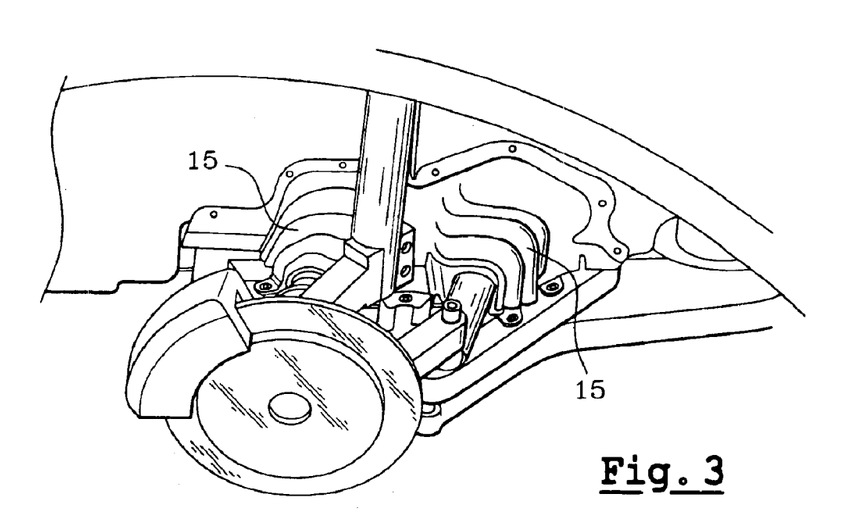
FIG. 3 is a perspective view of a clearance volume reserved to accommodate vertical travel of the front left wheel of another motor vehicle.

In the example of FIG. 3, all of the passages, including those for the torsion bars, are lined with bellows 15 that have been fitted thereto.

Figure 4:
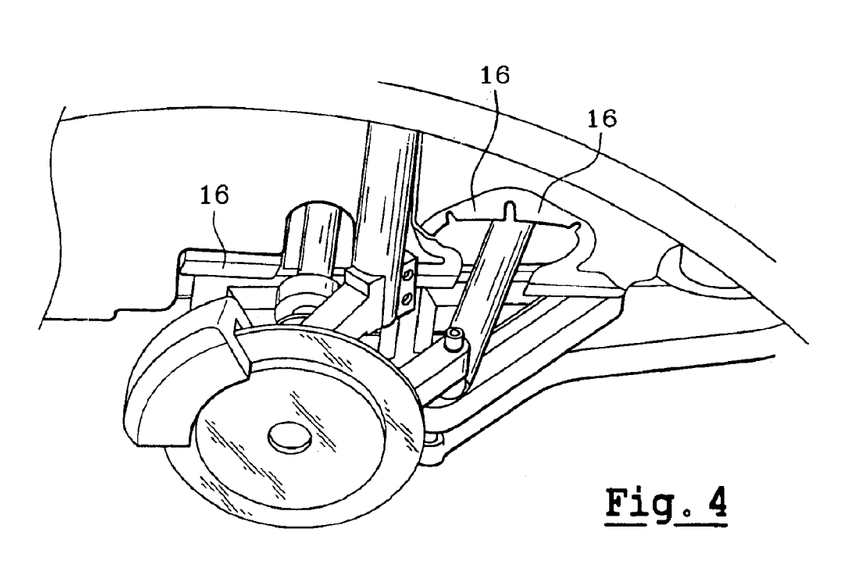
FIG. 4 is a view analogous to FIG. 3 showing a variant embodiment.

In the example of FIG. 4, the linings are in the form of flexible lips 16 formed integrally with the sound screen.

The various components of a side module made up of the sound screen formed by the mudguard are described below with reference to FIGS. 5 to 11.

As shown in FIG. 5, the central element of the side module is the mudguard 6 proper, comprising its substantially cylindrical portion 6A for overlying the top half of the wheel, and its low and high portions 6B and 6C which are substantially vertical.

The mudguard has fitted thereto an additional screen 17, e.g. made of thermoformed felt for taking position behind the light unit 4 (not shown in FIG. 5) that is to be applied to the vehicle by means of the mudguard, as described below.

The function of this additional screen 17 is to eliminate leaks passing around the light unit 4 (which has not yet been mounted), by being secured to the high vertical portion of the mudguard by snap-fastening along its rear edge 18 to a front edge 19 of said high vertical portion. At the front, the additional screen is for securing to a structural side piece as described below.

Figure 6:
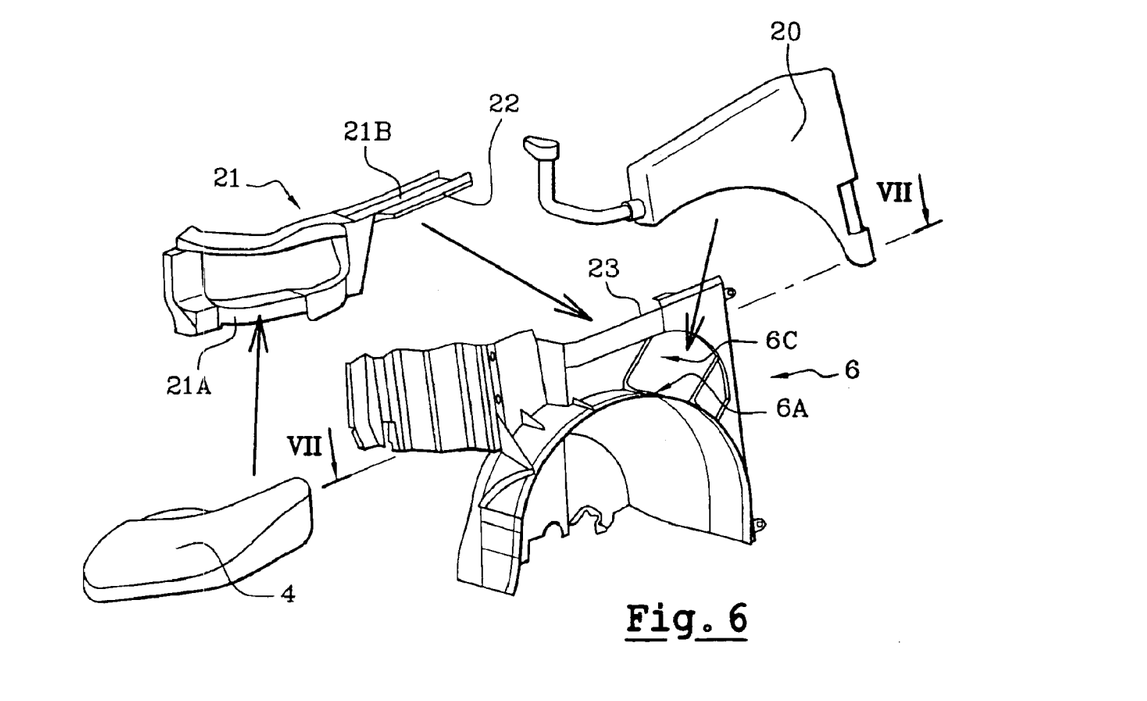
FIG. 6 shows the FIG. 5 part having additional members fixed thereto.

The assembly as obtained in this way is suitable for receiving various additional members, as can be seen in FIG. 6.

Firstly, a tank 20 for fluid for washing the windshield and/or the headlight is received on the substantially cylindrical portion 6A of the mudguard, in the space left empty between its high vertical portion 6C and the fender, which has not yet been fitted to the side module. Putting the tank 20 in this location presents two advantages. The first is that it provides good occupation of available space, the second is that it eliminates any risk of the fender denting, said tank serving as an internal support that prevents any inward deformation of the fender in the event of pressure being exerted on its outer skin.

The mudguard also receives the light unit 4 in front of its above-described additional screen 17, with a structural side piece 21 being interposed between them, which piece is referred to as a "quarter" in the description below.

The quarter 21 is a rigid piece made of fiber-reinforced polypropylene and provided with stiffening ribs, and it comprises a front portion 21A forming a frame suitable for receiving the light unit 4 and a rear portion 21B forming a beam that is to be secured to the fender support that forms part of the main structure of the vehicle.

As mentioned above, the frame 21A has snap-fastening means for engaging the front edge of the additional screen 17, enabling it to be put into place and removed in order to maintain the light unit.

Figure 7:
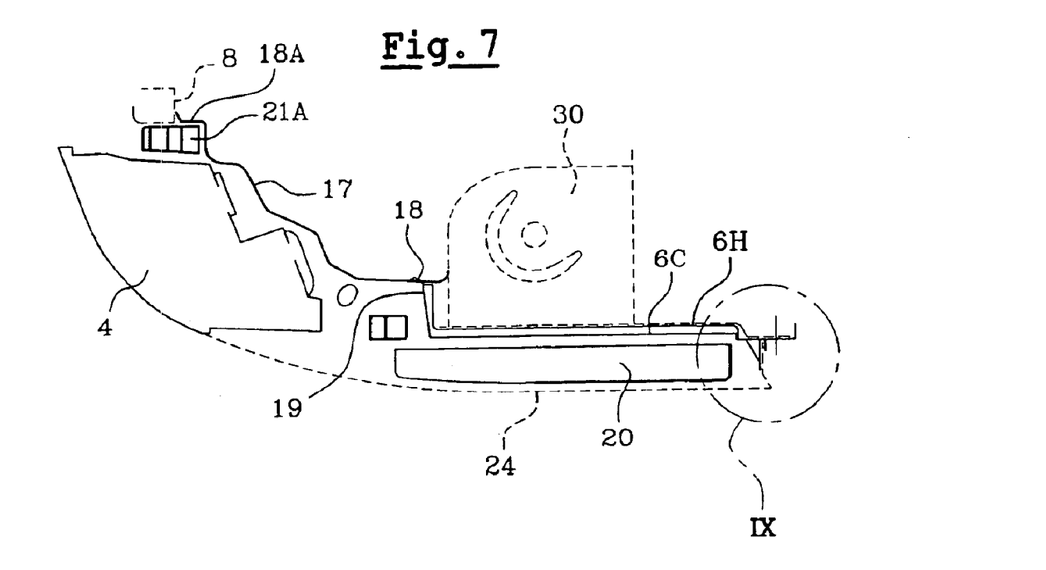
FIG. 7 is a horizontal section on VII-VII of FIG. 6 after the additional members have been put into place.

FIG. 7 shows in particular how the additional screen is snap-fastened via its front edge 18A to the frame 21A and via its rear edge 18 to the edge 19 of the high vertical portion. In this figure, dashed lines represent the housing 30 of the shock absorber, the cooling cassette 8, and the fender 24, all of which have yet to be assembled with the mudguard.

The beam 21B is fixed to the mudguard by screw fastening or snap-fastening between one of its own longitudinal edges 22 and the top edge 23 of the high vertical portion 6C of the mudguard.

It will be understood that the mudguard is not sufficiently rigid to withstand the forces transmitted by the quarter due to the weight of the light unit while the vehicle is in use. Nevertheless, the rigidity of the mudguard is sufficient in its high portion, which is thus stressed in its own main plane, to support the quarter and the light unit temporarily so long as the assembly remains static while waiting for mounting on the vehicle.

In contrast, during mounting on the vehicle, the beam 21B of the quarter coincides with the fender support 7 of the main structure and it is secured thereto firmly. The fender support 7 then takes up all of the forces to which the quarter is subjected, thereby relieving the mudguard and guaranteeing that the light unit remains properly adjusted while the vehicle is in use.

In other words, the mudguard serves as a temporary support for the light unit and the quarter.

Figure 8:
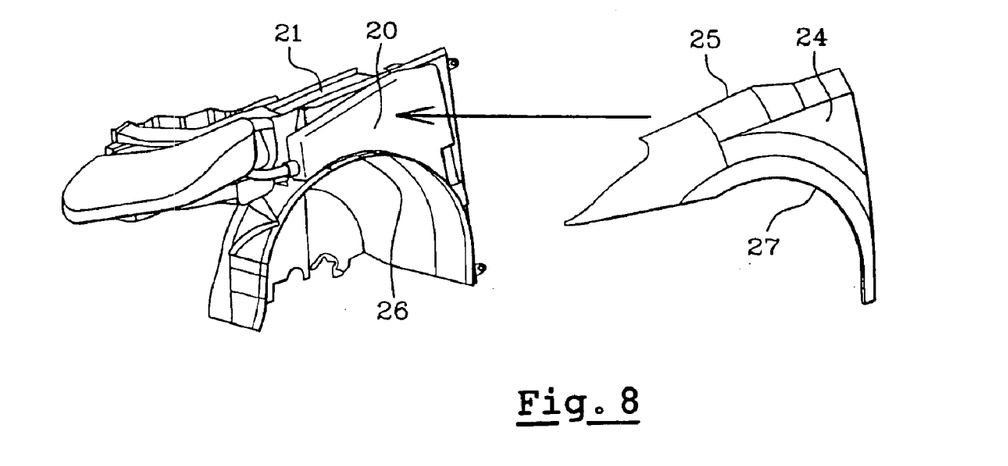
FIG. 8 shows the FIG. 6 part after additional members have been added, with a vehicle fender being fixed thereto in order to obtain a side module.

Finally, the fender 24 is put into place directly on the mudguard, as shown in FIG. 8.

The fender 24 is fixed to the quarter 21 via its top edge 25, by means of a sliding fastening (not shown) which is not described in detail in the context of the present description, and it fits around the rounded edge 26 of the substantially cylindrical portion 6A of the mudguard via a bottom rim 27 which is reentrant. The fender is thus under tension between its top edge 25 and its rounded bottom rim 27, thereby giving it a degree of rigidity, regardless of whether or not it is mounted on the vehicle.

Figure 9:
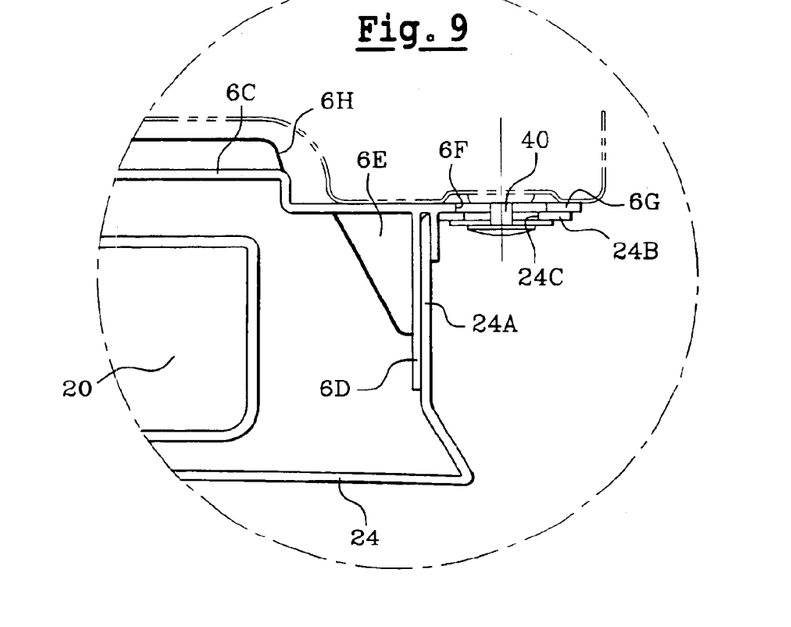
FIG. 9 is an enlargement of a detail IX of FIG. 7.

In addition, as shown in the detail of FIG. 9, the fender 24 is held along its vertical rear edge 24A by a bearing plate 6D stiffened by gusset ribs 6E. This bearing plate 6D provides additional stiffening for the fender and enables the assembly comprising the mudguard and the parts carried by the mudguard to be positioned longitudinally by positioning the fender longitudinally relative to the surrounding pieces of bodywork. In other words, instead of positioning the mudguard on the main structure and then putting the fender into position relative to the other parts, the assembly constituted by the mudguard 6 that forms a vertical sound screen, the tank 20, the quarter 21, and the optical unit 4 is positioned directly, constituting a self-contained module that is put into place as a single unit on a vehicle being assembled.

As shown in FIGS. 8 and 9, while this is taking place, the fender 24 is fixed to the door frame 9, the beam of the quarter to the fender support 7, and the frame of the quarter to the side rail 3. The front end of the frame of the quarter subsequently receives the cooling cassette 8 which interconnects the two side modules.

Parts are put into position relative to the main structure, the fender support providing horizontal and lateral positioning while the door frame provides longitudinal positioning. Additional support is provided by the side rail for supporting the weight of the light unit, for example.

As can be seen in FIG. 9, the fender is fixed to the main structure by means of rivets 40 passing through fixing orifices 24C formed in a rear vertical edge 24B of the fender. Each orifice 24C coincides with a larger-diameter orifice 6F formed in a fixing tab 6G of the mudguard. The orifices 24C and 6F leave clearance around the rivet 40 so that the module is positioned by the fender, which transmits its referenced position to the mudguard not via the orifice 6G but via the bearing plate 6D.

This bearing plate 6D also constitutes a rear edge of the mudguard which is connected in continuous manner with the rear edge of the fender, thus preventing any noise from leaking out between the fender and the upright of the door frame, without requiring any special gasket to be fitted in addition.

After carrying and prepositioning its various parts, the flexibility of the mudguard allows it to adapt to the geometrical configuration of the module that is imposed by putting it into position relative to the main structure.

In addition, in the very common circumstance of the wheel axle having shock absorbers 28 (FIG. 10), the flexibility of the mudguard allows it to deform so as to go behind the shock absorber and reconstitute the sound screen between the engine compartment and said shock absorber.

The mudguard has a vertical slot 25 extending over the entire height of its low portion 6B between its bottom edge 26 and an opening 27 formed in the cylindrical portion 6A for the purpose of passing the shock absorber, as can be seen in particular in FIG. 9. The mudguard can thus be opened by means of its slot 25 and then placed around the shock absorber 28.

In accordance with the invention, sound leaking between the engine compartment of the vehicle and the clearance allowed to accommodate vertical travel of the wheel is limited not only by the presence of the above-described vertical sound screen, but also by providing good sound tightness at the boundaries between the sound screen and its surroundings.

Thus, the top edge of the high vertical portion of the mudguard, and the top edge of the quarter are positioned in such a manner as to come directly into contact with the soundproofing layer lining the inside face of the hood.

Similarly, the invention provides for the sound channel due to the passage allowed for the shock absorber through the mudguard to be closed off in two different ways.

In a first embodiment, as can be seen in FIG. 2, a flexible lip 29 formed on the mudguard bears against the outside wall of the housing 30 of the shock absorber. Under such circumstances, the passage of the shock absorber through the mudguard is left without sealing, but this does not matter since the engine compartment does not communicate with the inside of the shock absorber housing, because of the flexible lip 29.

Figure 10:
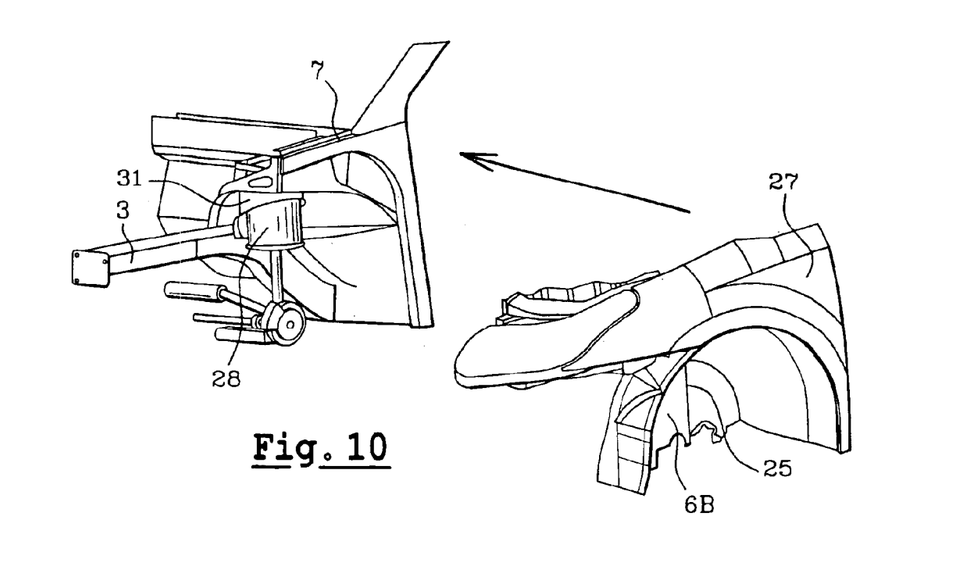
FIG. 10 shows the FIG. 8 module being mounted on the structure of a vehicle, as seen from the outside.
Figure 11:
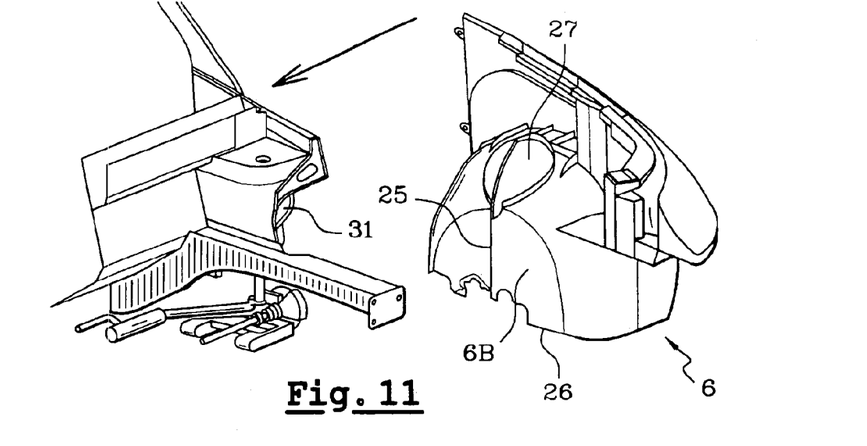
FIG. 11 is a view analogous to FIG. 10, as seen from inside the vehicle.
Figure 12:
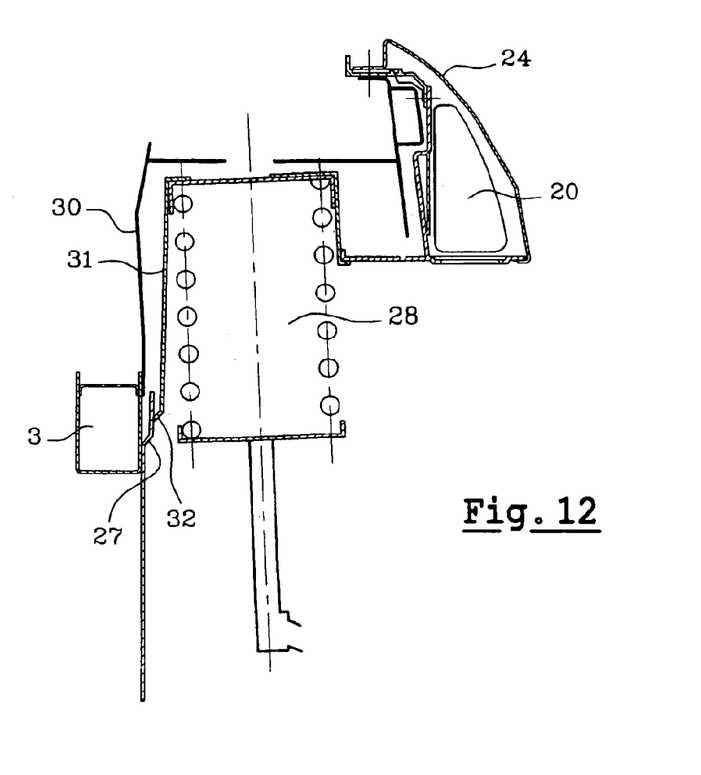
FIG. 12 is a diagrammatic vertical section of a soundproofing screen positioned on a vehicle, the section being on a plane containing the axis of a shock absorber of said vehicle.

In a second embodiment, shown in FIGS. 10 and 11, and more clearly visible in FIG. 12, the mudguard is extended upwards by a cap 31 which begins at the periphery of the orifice 27 through which the shock absorber 28 passes and which extends immediately over said shock absorber, such that the shock absorber is enclosed in the same volume as the wheel and no passage is provided between the engine compartment and said volume, not even around the shock absorber.

In practice, the cap 31 is a separate piece in the form of a pot which is placed upside-down over the shock absorber and which has an end wall that is clamped when the shock absorber is put into position between the shock absorber and the shock absorber housing.

While the mudguard is being put into place by opening up its slot, it takes position around the base of the cap. It is held there vertically by an outer edge 32 thereof forming a collar, as can be seen in FIG. 12.

Under such circumstances, the mudguard together with the cap 31 forms a continuous screen surrounding the wheel and the shock absorber.

Naturally, the embodiments described above are provided purely as examples and the invention is not in any way limited thereto. Modifying these examples would not go beyond the ambit of the invention.

What is claimed is:

1. A sound-insulating part for a motor vehicle having an engine compartment and, beside the engine compartment, a clearance volume for accommodating vertical travel of a wheel of the vehicle, the part being arranged to form a sound screen between said engine compartment and said volume, and extending between a fender support to which the part is secured and a side rail situated on the same side of the vehicle.

2. A part according to claim 1, including a sound-absorbing and/or insulating lining on a face facing towards the engine compartment in order to absorb at least a fraction of a sound emitted.

3. A part according to claim 1, supporting a gasket which presses against a hood covering the engine compartment so as to close off a passage putting the engine compartment into communication with the outside of the vehicle via clearance present between the hood and a front fender of the vehicle.

4. A part according to claim 1, having a rib that bears directly against sound-absorbing and/or insulating material lining the bottom face of a hood covering the engine compartment.

5. A part according to claim 1, having an additional screen, serving to occupy space behind a light unit that is to be applied to the vehicle by means of the mudguard, in order to eliminate leaks passing around said light unit.

6. A part according to claim 1, having a rear edge connected in continuous manner with a rear edge of a piece of bodywork supported by said part.

7. A part according to claim 1, having a rear vertical bearing plate serving as a longitudinal positioning abutment for a piece of bodywork carried by said part.

8. A part according to claim 1, extending beneath the side rail and closing off a region in which a wheel shaft is located, said part having a through hole a passage around the wheel shalt.

9. A part according to claim 8, wherein the through hole is lined with a gasket intended to connect the sound-insulating part to said wheel shaft.

10. A part according to claim 1, the part being constituted by a portion of a mudguard.

11. A motor vehicle mudguard, comprising, in addition to a substantially cylindrical portion for overlying the top portion of a wheel, a vertical portion forming a sound-insulating screen between an compartment of the vehicle and a clearance volume beside said engine compartment for accommodating vertical travel of said wheel, and wherein the vertical portion of the mudguard extends between a fender support to which the mudguard is secured and a side rail situated on the same side of the vehicle.

12. A mudguard according to claim 11, the mudguard being arranged to support at least one of the following pieces of equipment:

a tank for headlight and/or windshield cleaning fluid;

a direction-indicator repeater;

a tank gauge;

a computer;

a fuse box; and an engine connection box.

13. A mudguard according to claim 11, including a structural part which itself bears against said side rail.

14. A mudguard according to claim 13, supporting at least one of the following elements:

a headlight;

an intercooler radiator, optionally together with air flow ducts therefore; and a battery.

15. A mudguard according to claim 11, including a cap for placing over a shock absorber and which is connected to the substantially cylindrical portion of said mudguard.

16. A side module constituted by a mudguard according to claim 11, supporting a structural side piece carrying a light unit and a piece of bodywork mounted on the mudguard and on the structural side piece.

17. A module according to claim 16, wherein the mudguard also supports a tank of fluid for cleaning the windshield and/or the light unit, the tank being situated between the sound-insulating screen and a fender.

18. A part according to claim 5, wherein the screen is made in thermoformed felt.

19. A part according to claim 9, wherein the gasket is of the brush type.

* * * * *

UNITED STATES PATENT AND TRADEMARK OFFICE
CERTIFICATE OF CORRECTION

| | |
|---|---|
| PATENT NO. | : 6,880,883 B2 |
| DATED | : April 19, 2005 |
| INVENTOR(S) | : Laurent Decker, Philippe Gilotte and Arnold Fayt |

It is certified that error appears in the above-identified patent and that said Letters Patent is hereby corrected as shown below:

Title page,
Item [73], Assignee, delete "Compagnie Plastic Omnium, Lyons (FR)" and replace with:
-- Compagnie Plastic Omnium, Lyon (FR) --.

Column 8,
Lines 61-64, delete:
8. A part according to claim 1, extending beneath the side rail and closing off a region in which a wheel shaft is located, said part having a through hole a passage around the wheel shalt.
replace with
8. A part according to claim 1, extending beneath the side rail and closing off a region in which a wheel shaft is located, said part having a through hole allowing a passage around the wheel shaft.

Column 9,
Lines 3-11, delete:
11. A motor vehicle mudguard, comprising, in addition to a substantially cylindrical portion for overlying the top portion of a wheel, a vertical portion forming a sound-insulating screen between an compartment of the vehicle and a clearance volume beside said engine compartment of accommodating vertical travel of said wheel, and wherein the vertical portion of the mudguard extends between a fender support to which the mudguard is secured and a side rail situated on the same side of the vehicle.

UNITED STATES PATENT AND TRADEMARK OFFICE
CERTIFICATE OF CORRECTION

PATENT NO. : 6,880,883 B2
DATED : April 19, 2005
INVENTOR(S) : Laurent Decker, Philippe Gilotte and Arnold Fayt It is certified that error appears in the above-identified patent and that said Letters Patent is hereby corrected as shown below:

<u>Column 9 (cont'd),</u>
replace with:
11. A motor vehicle mudguard, comprising, in addition to a substantially cylindrical portion for overlying the top portion of a wheel, a vertical portion forming a sound-insulating screen between an engine compartment of the vehicle and a clearance volume beside said engine compartment for accomodating vertical travel of said wheel, and wherein the vertical portion of the mudguard extends between a fender support to which the mudguard is secured and a side rail situated on the same side of the vehicle.

Signed and Sealed this

Twenty-fifth Day of April, 2006

JON W. DUDAS
*Director of the United States Patent and Trademark Office*